Nov. 2, 1926.
G. M. CARR
1,605,215
CAMPER'S FRYING PAN
Filed Oct. 24, 1924
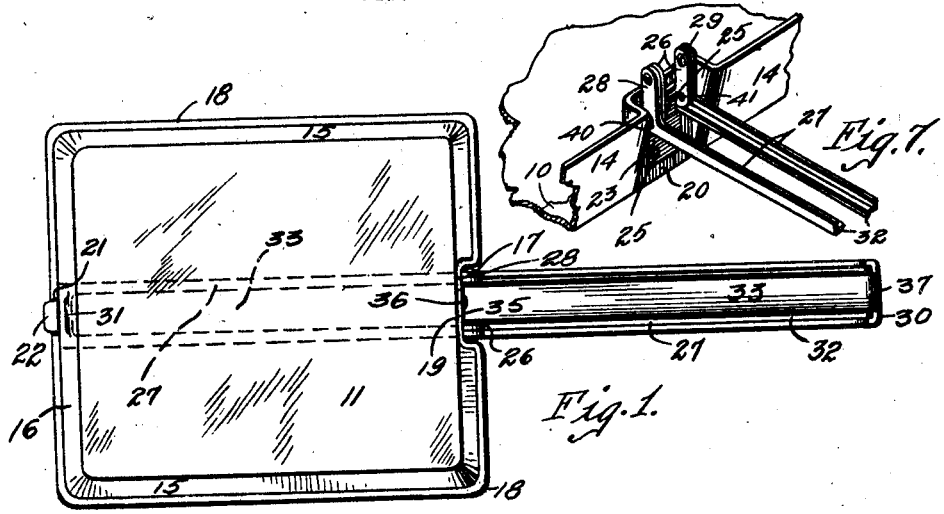
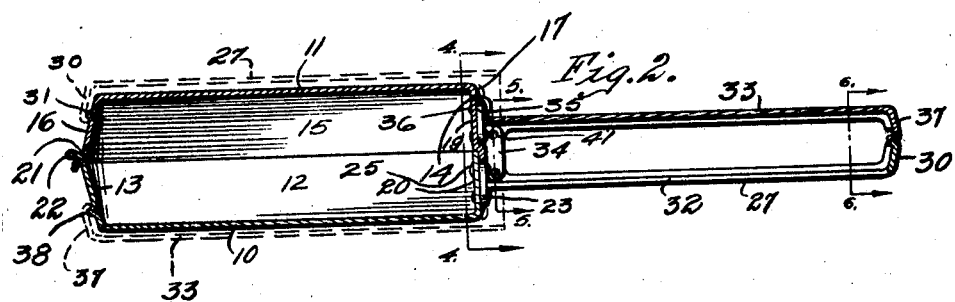
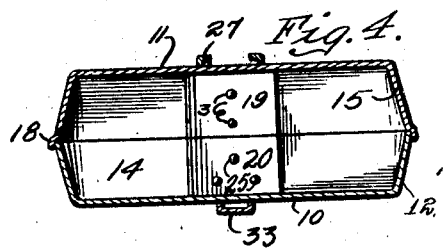
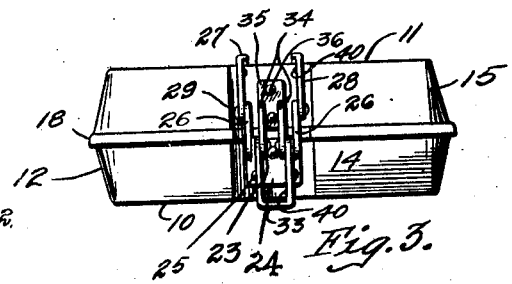
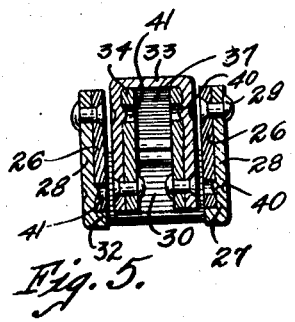
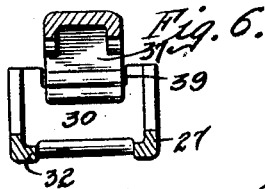
Inventor
Goldie M. Carr
by Onry & Hagen Attys Patented Nov. 2, 1926.

1,605,215

UNITED STATES PATENT OFFICE.

GOLDIE M. CARR, OF SPRINGVIEW, NEBRASKA.

CAMPER'S FRYING PAN.

Application filed October 24, 1924. Serial No. 745,605.

The object of my invention is to provide an improved camper's frying pan of simple, durable and inexpensive construction.

A further object is to provide an improved camper's frying pan formed substantially of two pan members, one being carried in an inverted position over the other so as to form a cover to keep out dirt and the like, and at the same time enable the operator to turn the pan over for the purpose of turning the food being fried, the upper and lower pans each being provided with a handle member so they may be separated and used as individual pans if so desired.

A further object is to provide in such a pan, improved handle members so arranged that when the pans are placed in position one relative to the other, the handles may be either used to support pans while in a frying position, or they may be moved to such position that they will form a binding member rigidly securing the pans together when in use and for transportation; and further to provide means whereby the pan may be brought to a more compact form.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of my improved frying pan.

Figure 2 is a central, longitudinal, sectional view of the same.

Figure 3 is an end elevation with the handles placed in a folded position.

Figure 4 is a sectional view taken on the line 4—4 of Figure 2, with the handles in their folded position.

Figure 5 is an enlarged, detail, sectional view taken on the line 5—5 of Figure 2.

Figure 6 is an enlarged, detail, sectional view taken on the line 6—6 of Figure 2.

Figure 7 is a perspective view of one of the individual pans with the handle in its extended position.

My improved frying pan comprises a lower pan member 10 and an upper pan member 11. The pan 10 has side members 12 and end members 13 and 14. The pan 11 is provided with side members 15 and end members 16 and 17. The side members 15 and the end members 16 and 17 are provided with a flange portion 18 designed to overhang the upper edge of the side and end members of the pan 10, the side and end members of each pan being flared outwardly, as clearly illustrated in Figures 2 and 4. The end members 15 and 14, however, are provided at their central portion with portions 19 and 20 which lie in a common plane perpendicular to the bottom members of the respective pans. These portions 19 and 20 are for the purpose of supporting the handle members of the pan. The end member 16 is provided with an opening 21 which is for the purpose of receiving a tongue 22 supported on the upper edge of the end member 13. This provides means whereby the end members 13 and 16 may be hooked and pivotally secured together.

The member 20 is provided with a hinge member 23 comprising a base plate 24 which is secured to the member 20 by means of rivets 25. Said base plate is also provided with upwardly and outwardly extending ears 26, the upper end of each of which is pivotally connected to one portion of a handle member 27. The handle member 27 has at its inner end downwardly projecting ears 28, as illustrated in Figures 3 and 5, each of which is pivotally connected to a respective ear member 26 by means of pivots 29. The pivot members 29 are located at a point above the upper edge of the pan member 10, while the members 28 are of such length that the handle member 27 may be folded over the top of the pan 11, as shown in dotted lines in Figure 2.

The free end of the handle member 27 is provided with a hook portion 30 which is designed to engage an outwardly projecting lug 31 from the end member 16, thereby locking the handle 27 into engagement with the top face of the pan 11. The member 30 and the member 16 are yieldable enough to permit locking action. The handle member 27 is provided with a longitudinal slot 32 through which another handle member 33 may be passed when folded. The said handle member 33 is pivotally connected to downwardly extending ears 34 from a plate 35 secured to the member 19 by means of rivets 36. The handle member 33 is designed to engage the under surface of the pan 13 when in a folded position, and having at its free end a hook portion 37 designed to engage an outwardly extending lug 38 from the end member 13. The handle members 33 and 27 may be moved to an unfolded position for supporting the pans, by simply swinging them outwardly from the pan members 10 and 11, to the position shown in Figures 1 and 2, with the hook member 37 resting on top of the hook member 30.

The hook member 30 is provided with a notch 39 which is designed to receive the hook member 37 to prevent lateral movement of the handles relative to each other, the handles 33 and 27 being spaced apart a slight distance when in their extended position, so that a better grip may be provided, the inner ends of the handles resting against the plates 19 and 20, as clearly shown in Figures 2 and 7. If it is desired, the pans may be separated and used separately, thereby forming two pans, one of the pans being illustrated in Figure 7.

In the members 34 and 26 I have provided openings 40 which are designed to be engaged by lugs 41 on the members 28 and 33, the said lugs 41 engaging the openings 40 at the time the handles 27 and 33 are in their extended position. This provides means whereby the said handles are locked permanently to the pan so that when the pans are used separately, they may be turned over and supported in an inverted position without the pan swinging to a vertical position while the handles are supported horizontally, there being sufficient resiliency in the metal of the parts 33 and 28 to permit the lugs 41 to disengage the openings 40.

The handle members 27 and 33 may be moved from their unfolded position, as shown in Figure 2, to their folded position, as shown by dotted lines in Figure 2, and as illustrated in Figure 3, as follows: The operator grasps the pan member 15 in one hand and the pan member 12 in the other hand, and then elevates the free end of the pan member 15 about the pivot members 21 and 22, permitting the member 37 to move inwardly until the said member 37 falls downwardly into the longitudinal slot 32 in the handle member 27, after which the member 15 may again be lowered to a folded position. The handle members 27 and 33 may then be folded to the position shown by dotted lines in Figure 2.

Thus it will be seen that I have provided a camper's frying pan of simple, durable and inexpensive construction which is adapted to be used double or single, and which is further adapted to be folded in a very compact space, particularly adapted for boy scouts, camp fire girls and tourists, the pan being adapted to receive plates, cups and other culinary devices while in a closed or folded position, thereby making a complete pack which is firmly packed and secured.

I claim as my invention:

1. A camper's frying pan comprising a pair of similar pan members having a bottom, side and end members, one being arranged in inverted relation to the other, means for hinging the edges of the adjacent end members at each end of said pan together, a handle for each of the opposite end members, each handle member being pivoted to its respective end member and shaped to follow the contour of the end and bottom portions of the opposite pan member when the handle members are in a folded position, and means for locking the free end of each of said handle members to its adjacent pan member.

2. A camper's frying pan comprising a pair of similar pan members having a bottom, side and end members, one being arranged in inverted relation to the other, means for hinging the edges of the adjacent end members at each end of said pan together, a handle for each of the opposite end members, each handle member being pivoted to its respective end member and shaped to follow the contour of the end and bottom portions of the opposite pan member when the handle members are in a folded position, and means for locking the free end of each of said handle members to its adjacent pan member, said handles also being adapted to be moved to an unfolded position for supporting the pans either together or individually.

3. A camper's frying pan comprising a pair of similar pan members having a bottom, side and end members, one being arranged in inverted relation to the other, means for hinging the edges of the adjacent end members at each end of said pan together, a handle for each of the opposite end members, each handle member being pivoted to its respective end member and shaped to follow the contour of the end and bottom portions of the opposite pan member when the handle members are in a folded position, means for locking the free end of each of said handle members to its adjacent pan member, said handles also being adapted to be moved to an unfolded position for supporting the pans either together or individually, and means for locking each of said handle members to its respective pan in an unfolded position.

4. A camper's frying pan comprising a pair of similar pan members having a bottom, side and end members, one being arranged in an inverted relation to the other, means for hinging the edges of the adjacent end members at each end of said pan together, a handle for each of the opposite end members, each handle member being pivoted to its respective end member and shaped to follow the contour of the end and bottom portions of the opposite pan member when the handle members are in a folded position, and when in a folded position are adapted to project outwardly from the pan members slightly spaced apart and parallel, the outer end of each handle member being provided with an inwardly extending portion, said portions being designed to engage each other to form a fulcrum to cause the pan members to be clamped together when the handle members are gripped by the operator's hand.

5. A camper's frying pan comprising a pair of similar pan members having a bottom, side and end members, one being arranged in an inverted relation to the other, means for hinging the adjacent end members at one end of said pan together, a handle for each of the opposite end members, each handle being pivoted to its respective end member and adapted to swing from a position projecting perpendicularly from said end member to a position adjacent to the end member and bottom portion of the opposite pan member, one of said handle members being provided with a longitudinal slot to permit the opposite handle member to pass through the same while being moved from its perpendicular position to a position adjacent to the pan.

GOLDIE M. CARR.